(12) United States Patent
Dumas

(10) Patent No.: US 7,770,704 B1
(45) Date of Patent: Aug. 10, 2010

(54) UNIVERSAL MULTIPLATE TORQUE CONVERTER CLUTCH SYSTEM AND METHOD OF USE

(75) Inventor: Andrew D. Dumas, Jericho, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 634 days.

(21) Appl. No.: 11/800,107

(22) Filed: May 4, 2007

(51) Int. Cl.
*F16H 45/02* (2006.01)

(52) U.S. Cl. ............. 192/3.29; 192/70.13; 192/DIG. 1; 29/401.1; 29/889.5

(58) Field of Classification Search ............. 192/DIG. 1
See application file for complete search history.

(56) References Cited

U.S. PATENT DOCUMENTS

| | | | | |
|---|---|---|---|---|
| 7,296,666 B1 * | 11/2007 | Morin | ........................ | 192/3.28 |
| 7,503,441 B2 * | 3/2009 | Cannon et al. | ............. | 192/3.29 |
| 7,565,958 B1 * | 7/2009 | Dumas | ...................... | 192/3.29 |
| 2008/0041685 A1 * | 2/2008 | Rowell | ...................... | 192/3.29 |

* cited by examiner

*Primary Examiner*—Richard M. Lorence
(74) *Attorney, Agent, or Firm*—Downs Rachlin Martin PLLC; Clifford Rey

(57) ABSTRACT

A multiplate torque converter clutch system, which is adapted for installation in torque converters of different automatic transmission manufacturers, namely, BORG WARNER, ALLISON, FORD, GENERAL MOTORS, and CHRYSLER transmissions. The present multiplate torque converter clutch system is provided in kit format including a hybrid lock-up piston/damper plate subassembly, multiple clutch plates including friction rings, a set of outer damper springs, and a set of inner damper springs. The present multiplate torque converter clutch system also includes a torque converter cover subassembly and a turbine hub subassembly configured to adapt the present torque converter clutch system to different vehicle engines and transmissions respectively. The hybrid lock-up piston/damper plate subassembly can be tuned to match a peak engine torque value by changing the number of damper springs. Advantageously, the present hybrid lock-up piston/damper plate subassembly is disassembled by removal of a single retaining ring to facilitate changes to the damper springs.

16 Claims, 22 Drawing Sheets

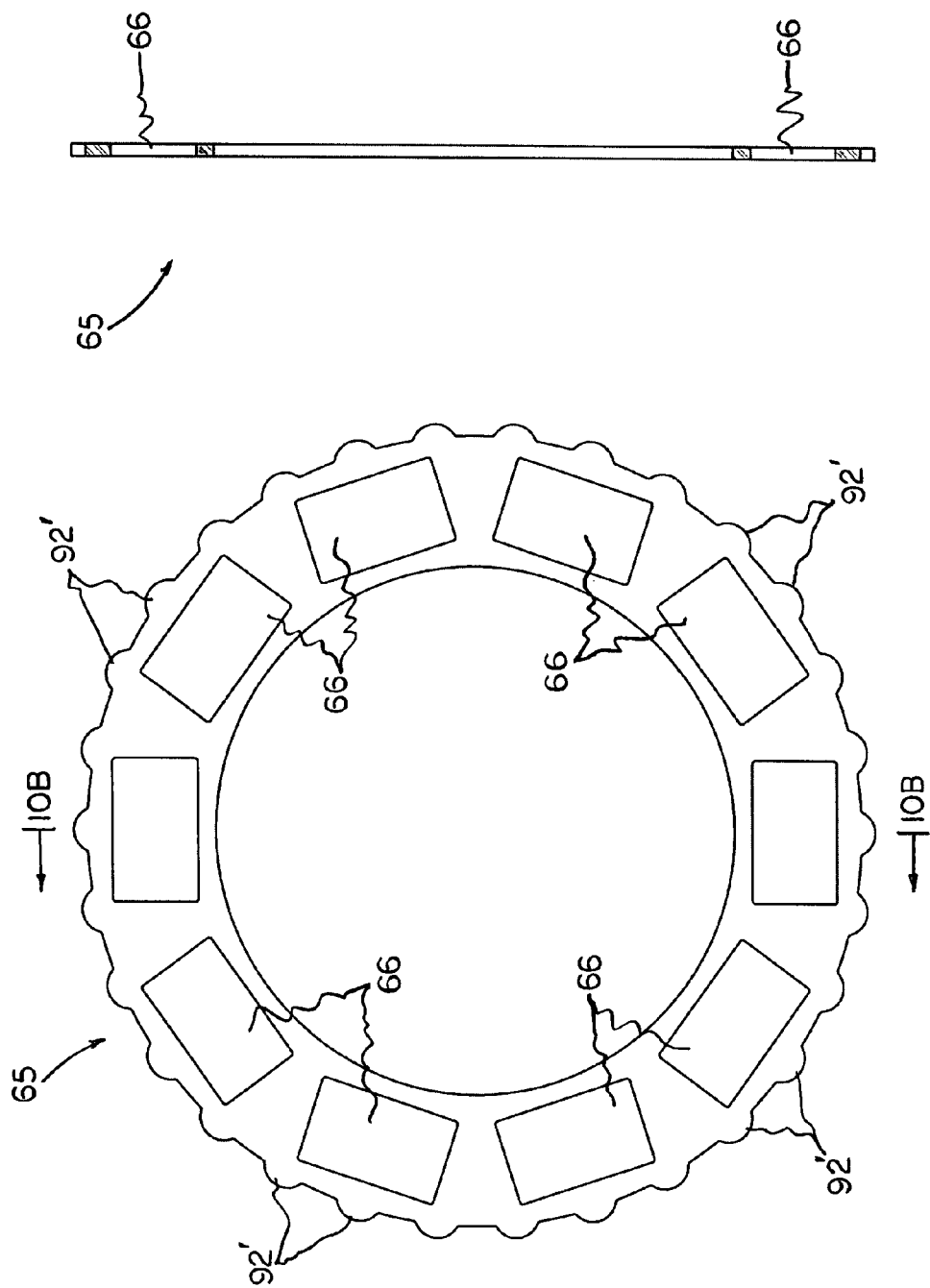
FIG. 10B
FIG. 10A

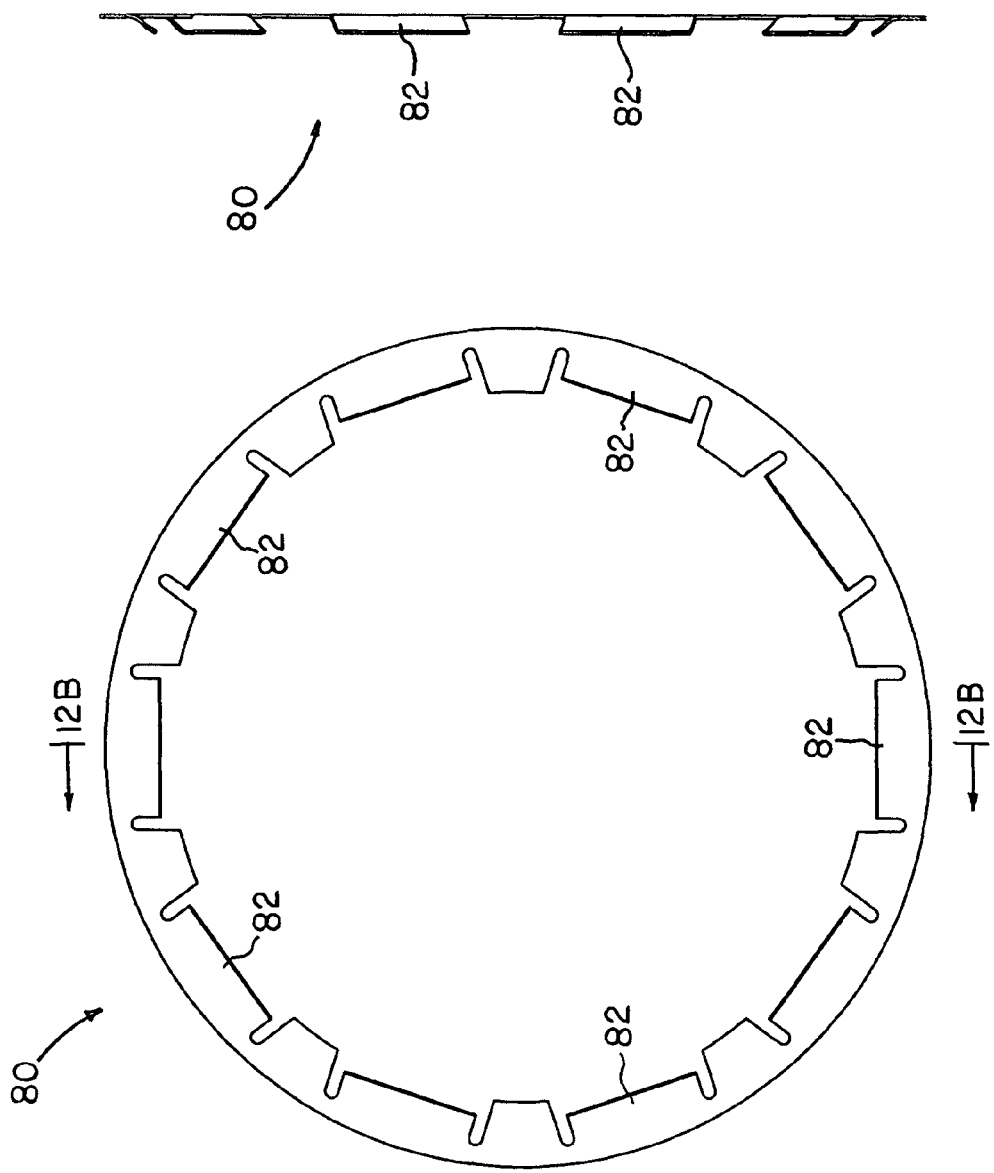

TABLE 1

| Peak Engine Torque | # of outer springs | # of inner springs |
|---|---|---|
| 625 ft-lbs | 10 | 0 |
| 750 ft-lbs | 10 | 2 |
| 875 ft-lb | 10 | 4 |
| 1000 ft-lbs | 10 | 6 |
| 1125 ft-lbs | 10 | 8 |
| 1250 ft-lbs | 10 | 10 |

FIG. 14

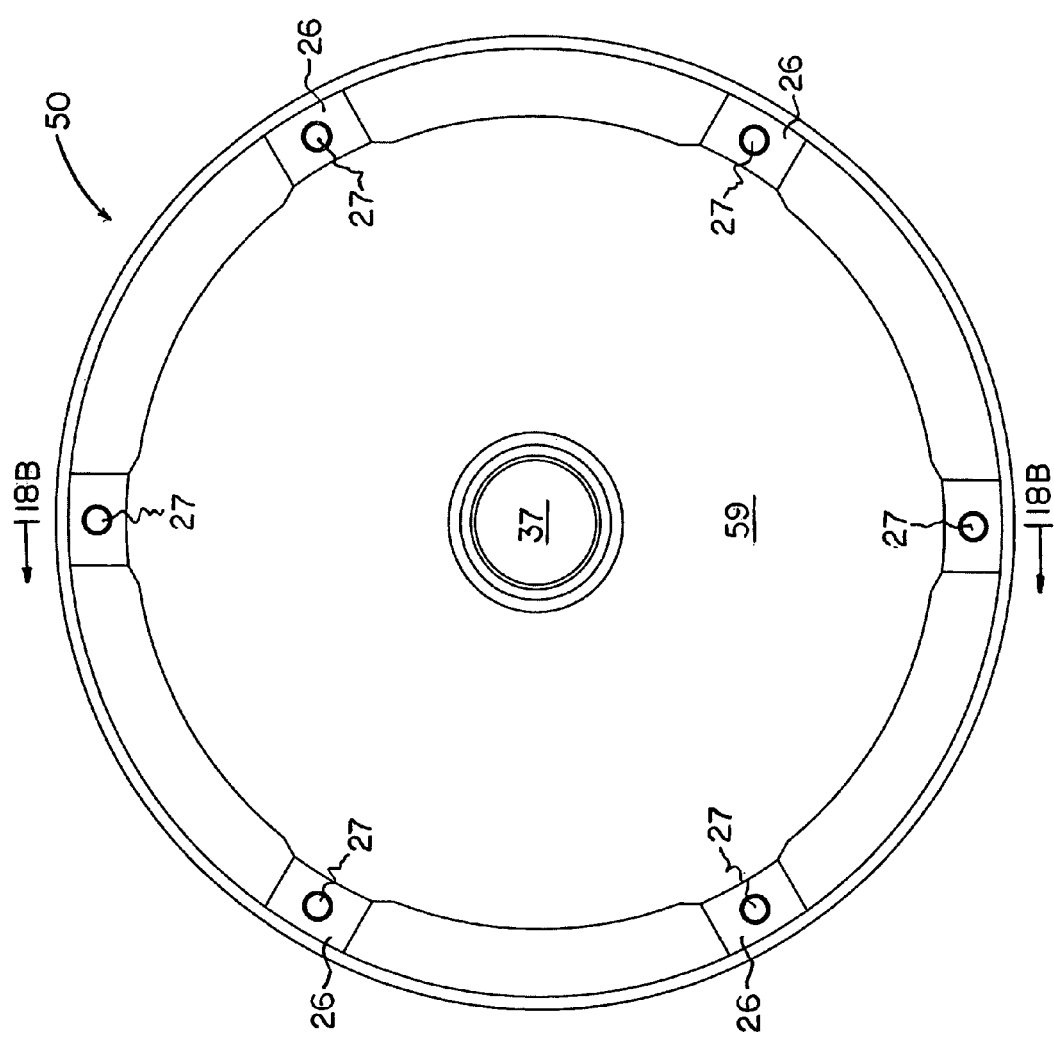

UNIVERSAL MULTIPLATE TORQUE CONVERTER CLUTCH SYSTEM AND METHOD OF USE

BACKGROUND OF INVENTION

The present invention relates to automatic transmissions for land vehicles and, more particularly, to a universal torque converter clutch system including a hybrid lock-up piston/damper plate subassembly, which is designed for installation in the torque converters of automatic transmissions from various manufacturers, namely, BORG WARNER, ALLISON, FORD, GENERAL MOTORS, and CHRYSLER or other similar automatic transmissions.

For purposes of this application the term "hybrid" will be understood to define the present lock-up piston/damper plate subassembly having components with features and characteristics derived from both the original equipment manufacture lock-up piston and damper plate components as provided with BORG WARNER, ALLISON, FORD, GENERAL MOTORS, and CHRYSLER transmissions (hereinafter "the subject transmissions").

The torque converter of an automatic transmission replaces the clutch used in manual transmissions. It is the primary component for transmittal of power between the engine and the transmission in an automotive vehicle. The basic principle of torque converter operation can be observed by placing the blades of two electric fans opposite each other and turning on one of the fans. If one of the fans is turned on, the force of the air column produced will act upon the motionless blades of the other fan, which will begin turning and eventually reach a speed approaching the speed of the powered fan. The torque converter employs an analogous mechanism using automatic transmission fluid (hereinafter "ATF") to provide a fluid coupling between the engine and the transmission of an automobile, which provides for a smooth conversion of torque from the engine to the mechanical components of the transmission.

During the torque converter lock-up cycle, the torque converter clutch 120 (see FIG. 1) is applied to eliminate the slippage that occurs through the fluid coupling and to provide a direct mechanical drive for efficient transfer of engine torque to the drive wheels. More particularly, during the lock-up cycle the torque converter clutch 120 is shifted axially forward by ATF pressure and frictionally engages an inner surface of the torque converter cover 125 to affect such direct mechanical drive. The torque converter cover 125 rotating at engine speed instantaneously engages the damper plate assembly 146 (see FIG. 3) when actuated by the lock-up piston 142, which serves to transmit the rotational torque of the engine directly to the transmission. The damper plate assembly 146 functions to absorb the sudden impact of such direct mechanical drive engagement to prevent damage to the turbine shaft and also to the friction materials within the torque converter clutch 120.

Still referring to FIG. 3 the prior art damper plate assembly 146 includes an array of radially disposed damper springs 147 having a predetermined strength (i.e. spring rate), which are permanently captured in the riveted construction of the prior art damper plate assembly. The strength of such damper springs 147 is factored into the design of the damper plate assembly 146 based on the factory specified peak engine torque generated in a given vehicle engine, which is critical to the proper function of the lock-up clutch.

However, in the automotive aftermarket various engine-tuning modules are marketed for truck engines utilizing the subject transmissions, which deliver the most powerful, street-legal tuning available for towing the maximum loads allowed by the vehicle manufacturer. At such higher horsepower gains the original equipment manufacture (hereinafter "OEM") lock-up clutch 120 including the damper plate assembly 146 is often overmatched and prone to failure.

More particularly, it is well known in the industry that when the subject transmissions, which were initially designed to operate behind a truck engine manufactured to a factory torque specification, are utilized in a higher horsepower application, the spring strength of the OEM damper plate assembly 146 is inadequate and the damper springs 147 may be compressed beyond their working limits. This results in mechanical damage to the damper plate assembly 146, friction rings 130, and also to the turbine shaft spline as at 153 (FIG. 1) during the torque converter lock-up cycle and other peak torque events.

Thus, the present invention has been developed to resolve this problem and other shortcomings of the prior art.

SUMMARY OF THE INVENTION

Accordingly, the present invention is a universal multiplate torque converter clutch system, which is designed for installation in automatic transmissions of different vehicle manufacturers, namely, the subject transmissions, and other similar automatic transmissions.

The present universal multiplate torque converter clutch system is provided in kit format including a hybrid lock-up piston/damper plate subassembly, multiple clutch plates including friction rings, at least two sets of damper springs, a spring retainer, a retaining ring (i.e. snap ring), a turbine hub, a front cover, a front cover bushing and ATF seals necessary to adapt the present clutch system to a specific vehicle engine and automatic transmission.

Advantageously, the present invention provides for tuning of the present hybrid lock-up piston/damper plate subassembly to match peak engine torque by changing the number of damper springs therein. To this end the hybrid lock-up piston/damper plate subassembly is conveniently disassembled by the removal of a single snap ring in comparison to the permanent riveted construction of the OEM damper plate assembly. Further, the present universal multiplate torque converter clutch system is suitable for both diesel and gasoline engine applications.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 10A is a top plan view of one of an identical pair drive plates of the present invention;

FIG. 10B is a longitudinal cross-section taken along section line 10B-10B of FIG. 10A;

FIG. 12A is a top plan view of the spring retainer of the present invention;

FIG. 12B is a longitudinal cross-section of the spring retainer of FIG. 12A taken along section line 12B-12B;

FIG. 14 shows a reference table of engine torque values (expressed in foot-lbs.) for determining the number of damper springs to be installed in the hybrid lock-up piston/damper plate subassembly of the present invention;

FIG. 18A is a top plan view of the front cover of the present invention;

DETAILED DESCRIPTION OF THE INVENTION

Figure 1:
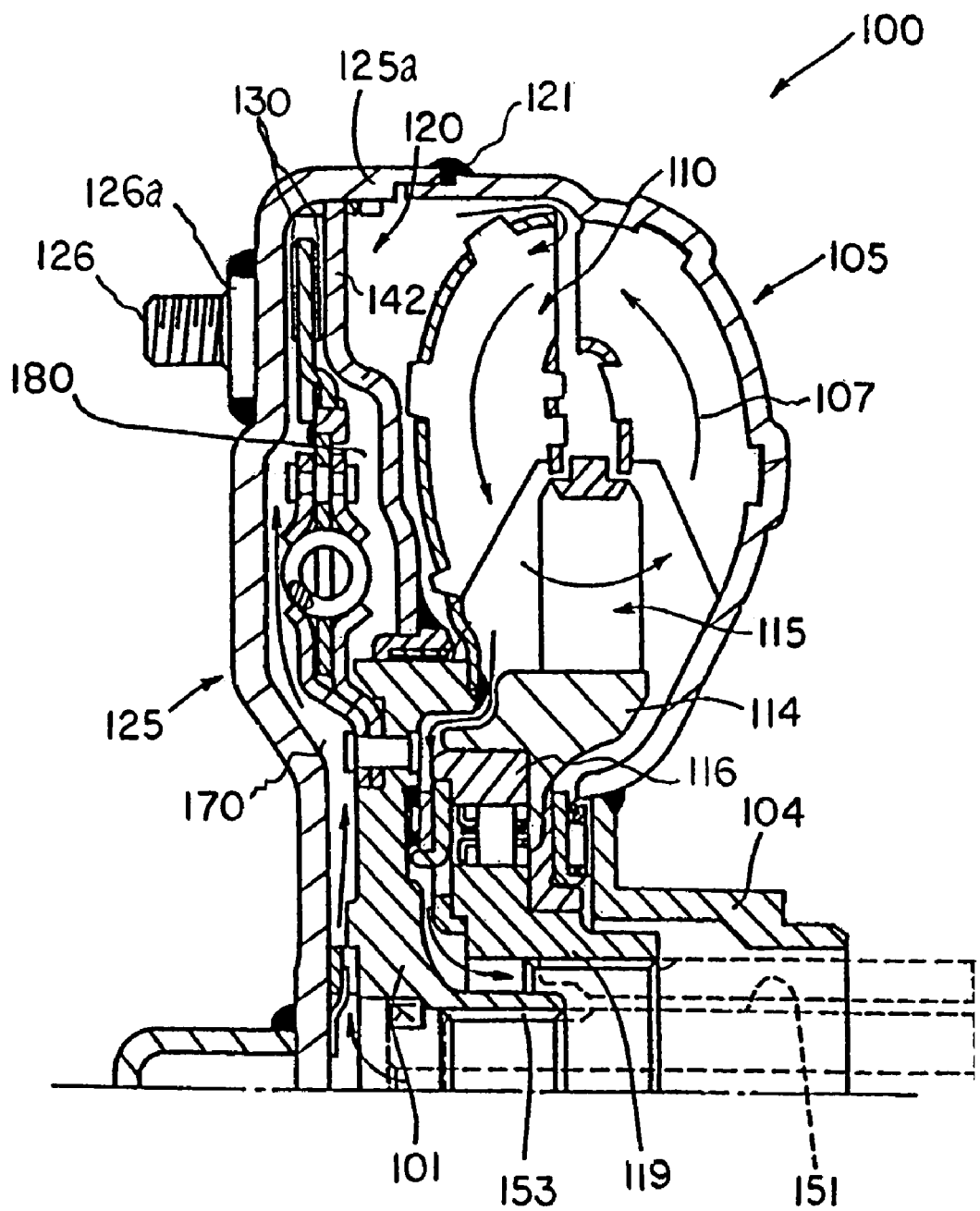
FIG. 1 is a partial longitudinal cross-section of a torque converter assembly including an impeller assembly, a turbine assembly, and a torque converter cover and is labeled Prior Art.

Prior to describing the present invention in detail, it may be beneficial to briefly review the structure and function of a prior art torque converter and torque converter clutch of an automatic transmission in more detail. With further reference to the drawings there is shown therein a partial, cross-sectional view of such a prior art torque converter assembly, indicated generally at 100 and illustrated in FIG. 1, which is the primary component for transmittal of power between the engine and the automatic transmission or transaxle in an automotive vehicle. The torque converter assembly 100 provides for a smooth conversion of torque from the vehicle's engine to the mechanical components of the transmission and also functions to multiply torque generated by the engine enabling the vehicle to achieve additional performance when necessary.

Torque converter assembly 100 is comprised of the following main sub-assemblies: (1) an impeller assembly, indicated generally at 105, which is the driving member; (2) a turbine assembly, indicated generally at 110, which is the driven member; (3) a stator assembly, indicated generally at 115, (4) a lock-up clutch assembly, indicated generally at 120, which is attached to the turbine assembly 110 to enable direct mechanical drive; and (5) a torque converter cover, indicated generally at 125, which is typically welded as at 121 to the impeller assembly 105.

Figure 2:
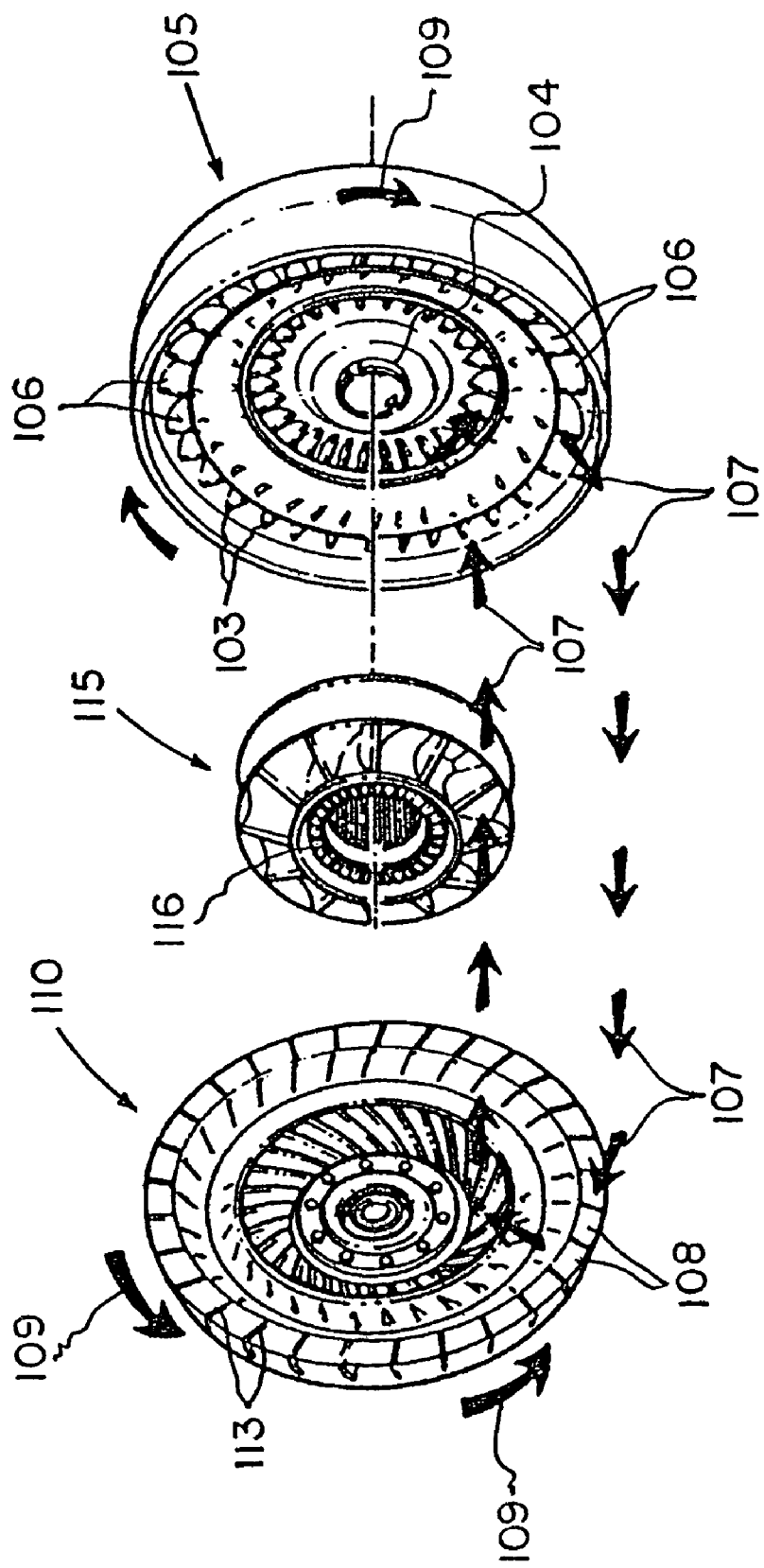
FIG. 2 is an exploded perspective view of the torque converter assembly of FIG. 1 including the turbine, stator, and impeller assemblies illustrating the flow of automatic transmission fluid therein and is labeled Prior Art.

Cover 125 is connected to the engine flywheel (not shown) by threaded studs 126 supported by stud flanges 126a, which are attached to the cover so that it will rotate at engine speed. When the engine is running, the impeller assembly 105 acts as a centrifugal pump by picking up ATF at its center and discharging it at its rim between the impeller blades 103 as more clearly shown in FIG. 2 (see directional arrows 107) establishing toroidal ATF out-flow passages 106 in fluid communication with toroidal ATF in-flow passages 108 defined by turbine blades 113. The force of the ATF hits the turbine blades 108 and causes turbine assembly 110 to rotate as indicated (see directional arrows 109). As the engine and impeller assembly 105 increase in speed, so does the turbine assembly 110.

Figure 3:
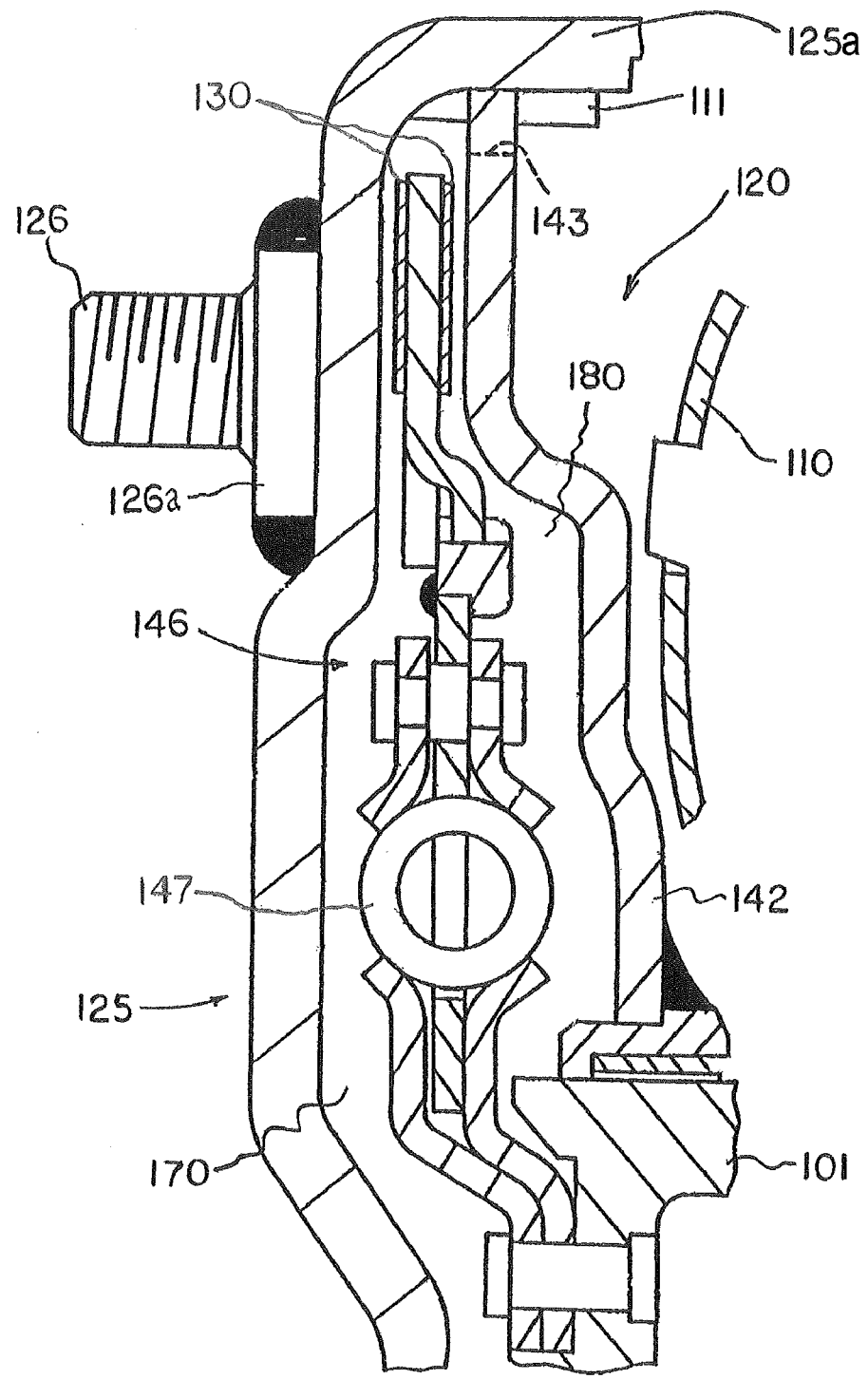
FIG. 3 is an enlarged partial longitudinal cross-section of the torque converter assembly of FIG. 1 showing further details thereof and is labeled Prior Art.

As shown in further detail in FIG. 3, the prior art lock-up piston 142 including peripheral teeth 143 engages inwardly extending ribs 111 formed on the inner surface of cylindrical portion 125a of cover 125 and also attaches to the turbine hub 101 to provide a mechanical coupling of the engine to the transmission during the torque converter lock-up cycle. When the lock-up clutch 120 is applied, the slippage that occurs through the fluid coupling is eliminated thereby providing a direct mechanical drive for efficient transfer of engine torque to the drive wheels.

Referring again to FIGS. 1-2, a stator assembly 115 is located between the impeller assembly 105 and the turbine assembly 110 and is mounted on a stator carrier 114 that is connected to an inner race 119 through a one-way roller clutch 116, which allows rotation in only one direction. The function of the stator assembly 115 is to redirect fluid returning from the turbine assembly 110 (see directional arrows 107) to assist the engine in turning the impeller assembly 105.

The impeller assembly 105 is supported by an impeller hub 104 (FIG. 1), which extends from the impeller assembly 105 along its longitudinal axis and engages the hydraulic pump (not shown) in the transmission. The turbine shaft 151 (FIG. 1) extends through the impeller hub 104 and delivers power to the transmission.

When the lock-up clutch 120 is installed within the torque converter cover 125 as most clearly shown in FIG. 3, a clutch release chamber 170 is formed between the cover 125 and the lock-up clutch 120. When the fluid pressure behind the lock-up clutch 120 in the clutch apply chamber 180 exceeds the pressure in the release chamber 170, the lock-up cycle is initiated and the clutch is shifted forward to engage the cover 125 establishing a mechanical torque flow path coupling the engine flywheel to the transmission.

Figure 4:
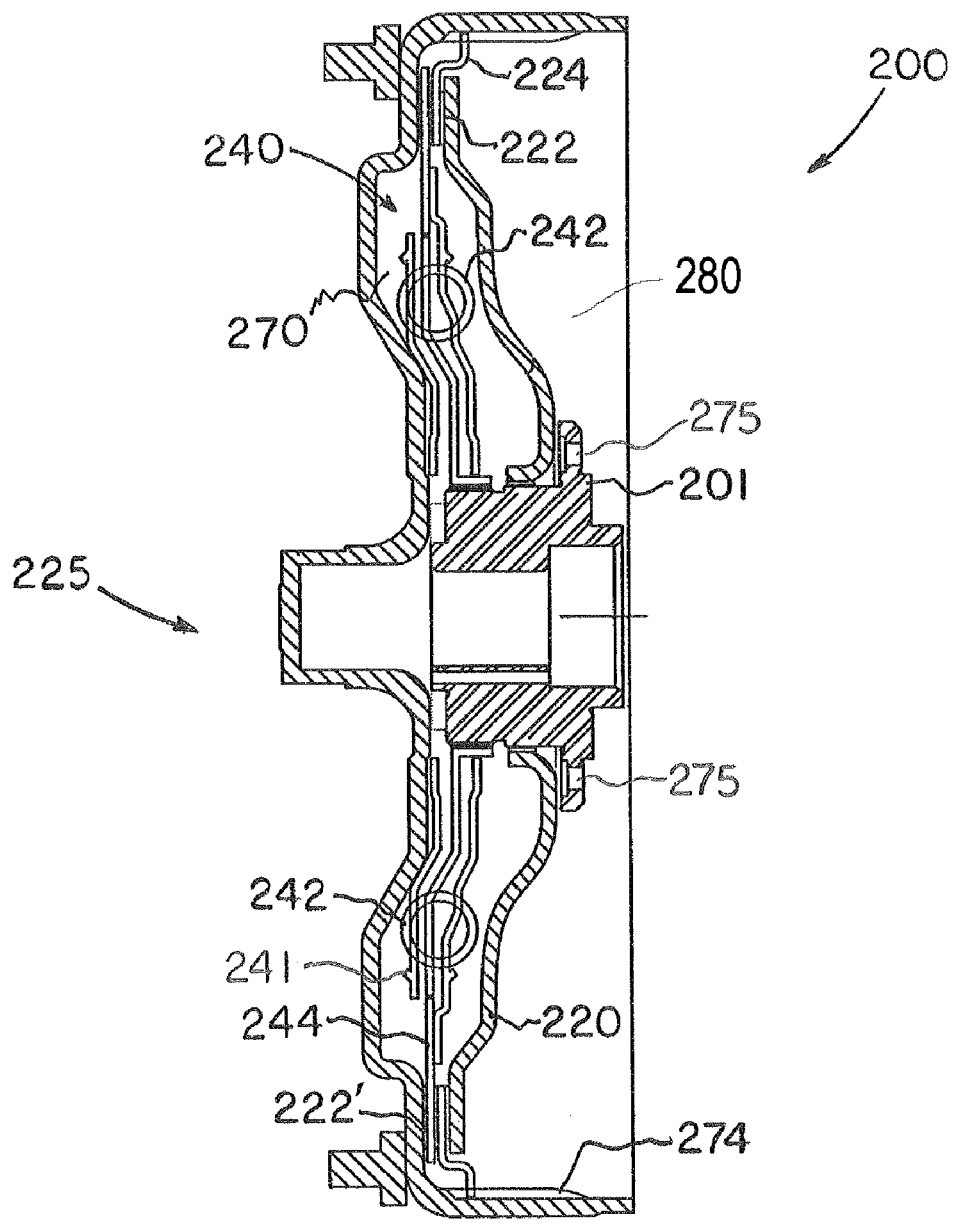
FIG. 4 is a longitudinal cross-section of a FORD E40D torque converter cover including a torque converter lock-up clutch wherein the present invention is utilized and is labeled Prior Art.

Referring to FIG. 4 the latest versions of the subject transmissions use a more sophisticated converter clutch system that is used in virtually all transmissions being produced for automobiles today (i.e. the electronic/hydraulic multiplate torque converter clutch assembly). The lock-up cycle in such an electronic converter clutch systems is controlled by a microprocessor within the vehicle's onboard computer (not shown).

For purposes of explanation the mechanical components of such an electronic/hydraulic torque converter clutch system for a FORD E4OD transmission, illustrated in FIG. 4 and indicated generally at 200. In this embodiment a so-called multiplate lock-up clutch assembly 200 includes a piston 220, a splined friction plate 224, and a damper plate assembly, indicated generally at 240, installed within the front cover 225 just forward of the turbine assembly. Friction plate 224 includes friction material (i.e. a friction ring 222) on its aft surface, which contacts the adjacent forward surface of the piston 220 during the lock-up cycle. Damper plate 244 also has friction rings 22T on both its forward and aft surfaces, which engages a lock-up surface 245 formed on the radial wall 223 of cover 225 during the lock-up cycle as more clearly shown in FIG. 6.

In a multiplate lock-up clutch of the type shown in FIG. 4, the damper plate 244 also includes damper springs 242 disposed within radially spaced spring pockets 246 to absorb the impact of lock-up clutch engagement. It will be appreciated that the prior art damper plate 244 is a riveted construction wherein damper springs 242 are permanently captured in position by installation of rivets 249 (FIG. 5), which extend through the damper plate 244 and a spring retainer plate 241.

Figure 5:
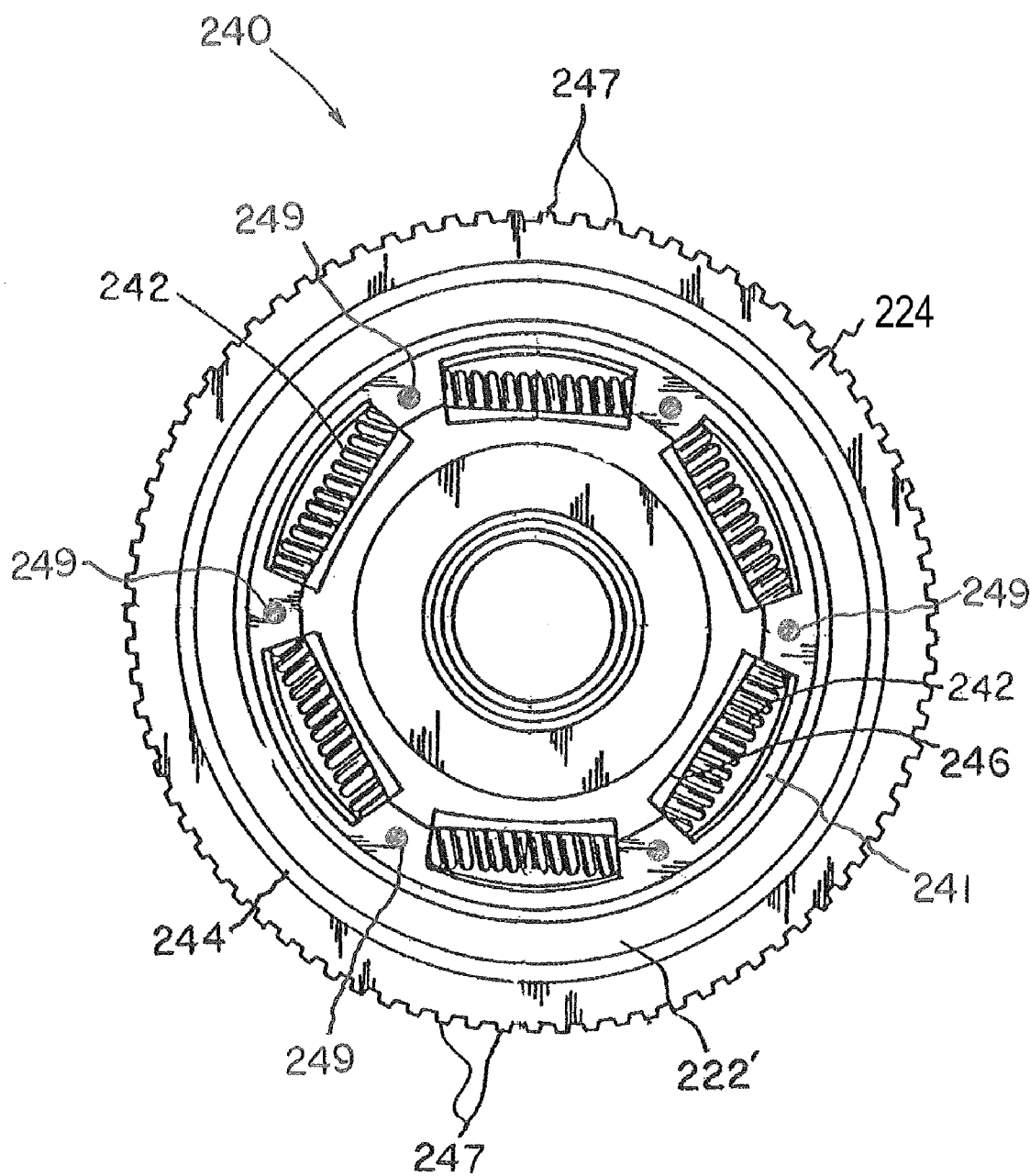
FIG. 5 is a top plan view of the damper plate assembly of a FORD E4OD lock-up clutch and is labeled Prior Art.
Figure 6:
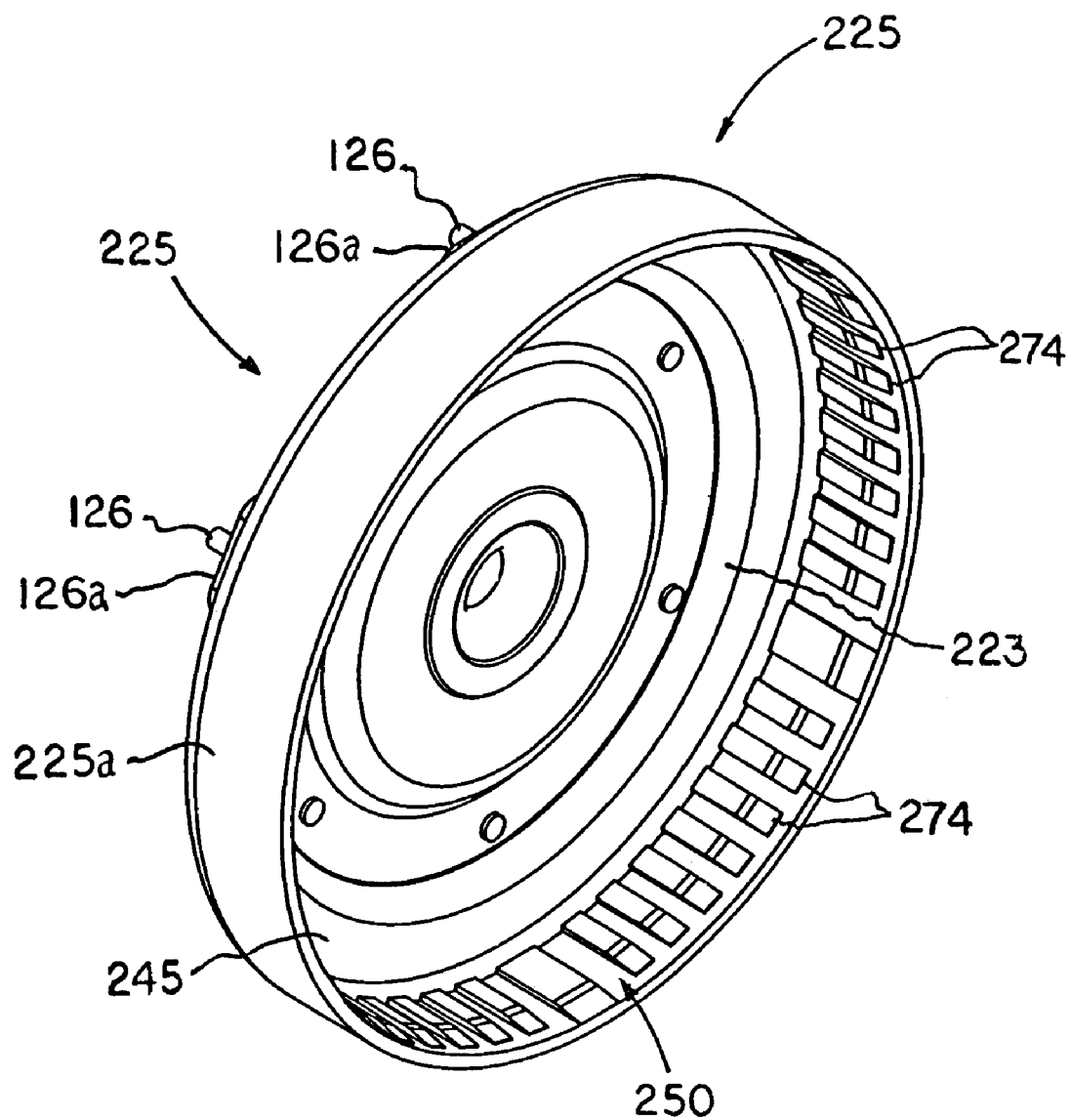
FIG. 6 is a perspective view of a torque converter cover for the FORD E4OD transmission showing an array of embossments formed therein and is labeled Prior Art.

In the electronic/hydraulic converter clutch system shown in FIG. 4, when the vehicle is cruising and lock-up is appropriate, an electric solenoid is energized which opens the converter clutch control valve (not shown) increasing ATF pressure in the apply chamber 280. This allows ATF pressure to act upon the piston 220 to actuate the lock-up clutch. Friction plate 224 is guided forward in an axial direction by an array of teeth 247 formed about the periphery thereof as shown in FIG. 5. In the subject transmissions teeth 247 on the friction plate 2244 (FIG. 5) traverse an array of mating teeth 274 formed in the cover 225 (FIG. 6). Friction plate 224 together with piston 220 act upon the damper assembly 240, which, in turn, is forced against the lock-up surface 245 on the front cover 225. Lock-up piston 220 is also connected to the turbine hub 201, which drives the turbine shaft (not shown) and, thus, a direct mechanical link between the engine and transmission is established.

Still referring to FIG. 4 when converter lock-up is no longer required, a port opens that allows pressurized ATF to flow into the clutch release chamber 270 thereby releasing the lock-up clutch 200. ATF then flows out of the apply chamber 280 and the piston 220 moves away from the lock-up surface 245 re-establishing the fluid coupling.

Referring again to FIG. 5 the prior art damper plate assembly 240 also includes an array of radially disposed damper springs 242 having a predetermined strength (i.e. spring rate), which are permanently captured within spring pockets 246 by the riveted construction of the damper plate assembly. The strength of damper springs 242 is also factored into the design of the damper plate assembly 240 based on the torque generated by a particular vehicle's engine and is critical to the proper function of the lock-up clutch.

However, in the automotive aftermarket engine tuning modules are marketed for both diesel and gasoline truck engines, which deliver the most powerful, street-legal tuning available for towing the maximum loads allowed by the vehicle manufacturer. At such higher horsepower gains the OEM lock-up clutch 200 including the damper plate assembly 240 is mismatched against such increased engine torque and prone to failure during peak torque events.

More particularly, when the subject transmissions are utilized in such higher horsepower applications, the strength of damper springs 242 in the OEM damper plate assembly 240 is insufficient and the damper springs can be compressed beyond their working limits (i.e. springs 242 "bottom out" in the spring pockets 246) during converter lock-up. This results in mechanical damage to the damper plate assembly 240, friction rings 222, 222', and also to the turbine shaft 151 during the lock-up cycle.

Figure 7:
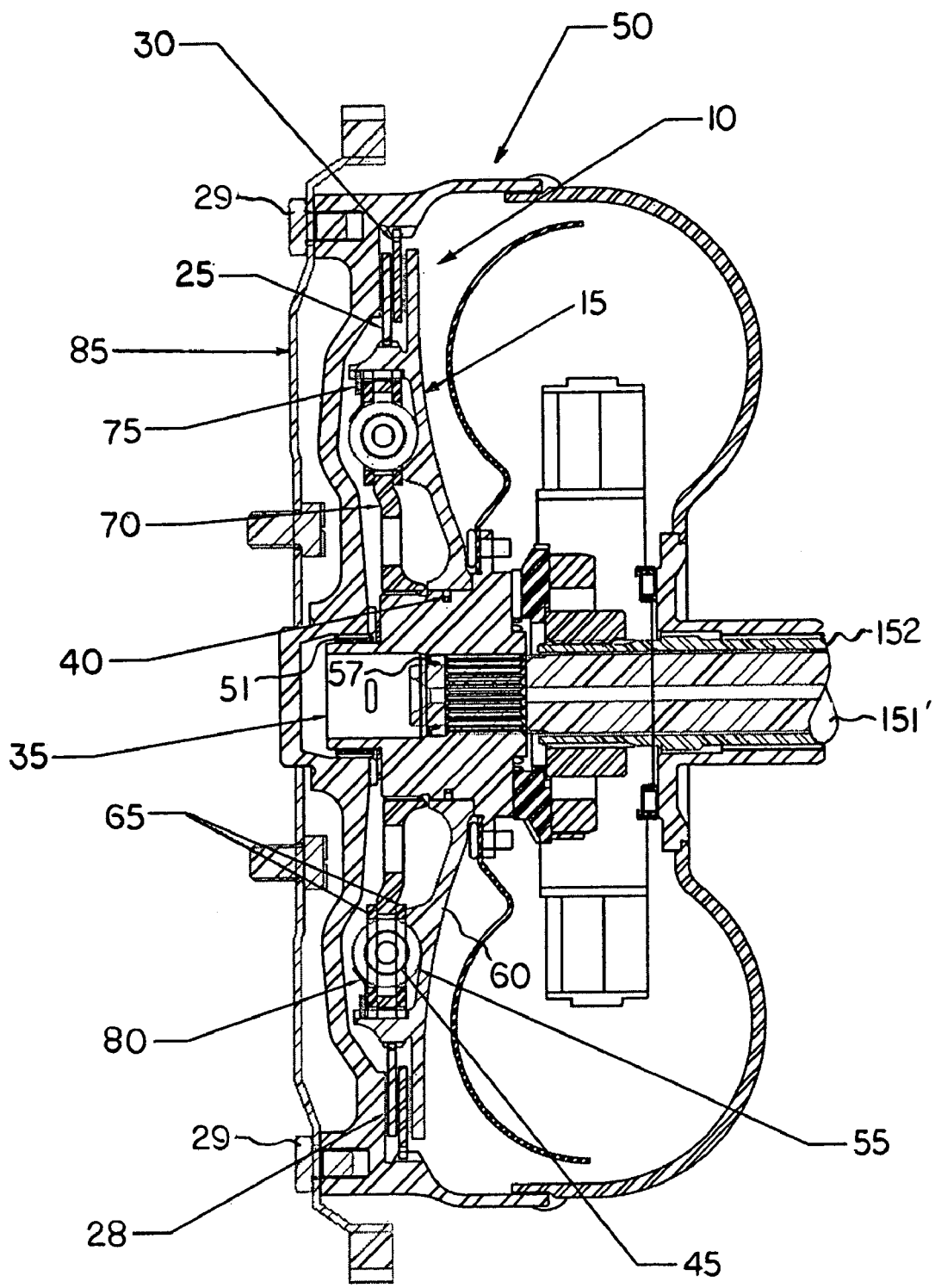
FIG. 7 is a longitudinal cross-section of a torque converter assembly showing the present universal multiplate torque converter clutch system of the present invention.

Thus, the present invention has been developed to resolve this problem and will now be described. Referring to FIG. 7 there is shown therein a universal multiplate torque converter clutch system in accordance with the present invention, indicated generally at 10. The present universal clutch system 10 is comprised of the following subassemblies and components: (1) a hybrid lock-up piston/damper plate subassembly, indicated generally at 15; (2) a primary clutch plate, indicated generally at 25; (3) a secondary clutch plate, indicated generally at 30; (4) a turbine hub subassembly, indicated generally at 35; and (5) a front cover subassembly, indicated generally at 50.

Figure 8:
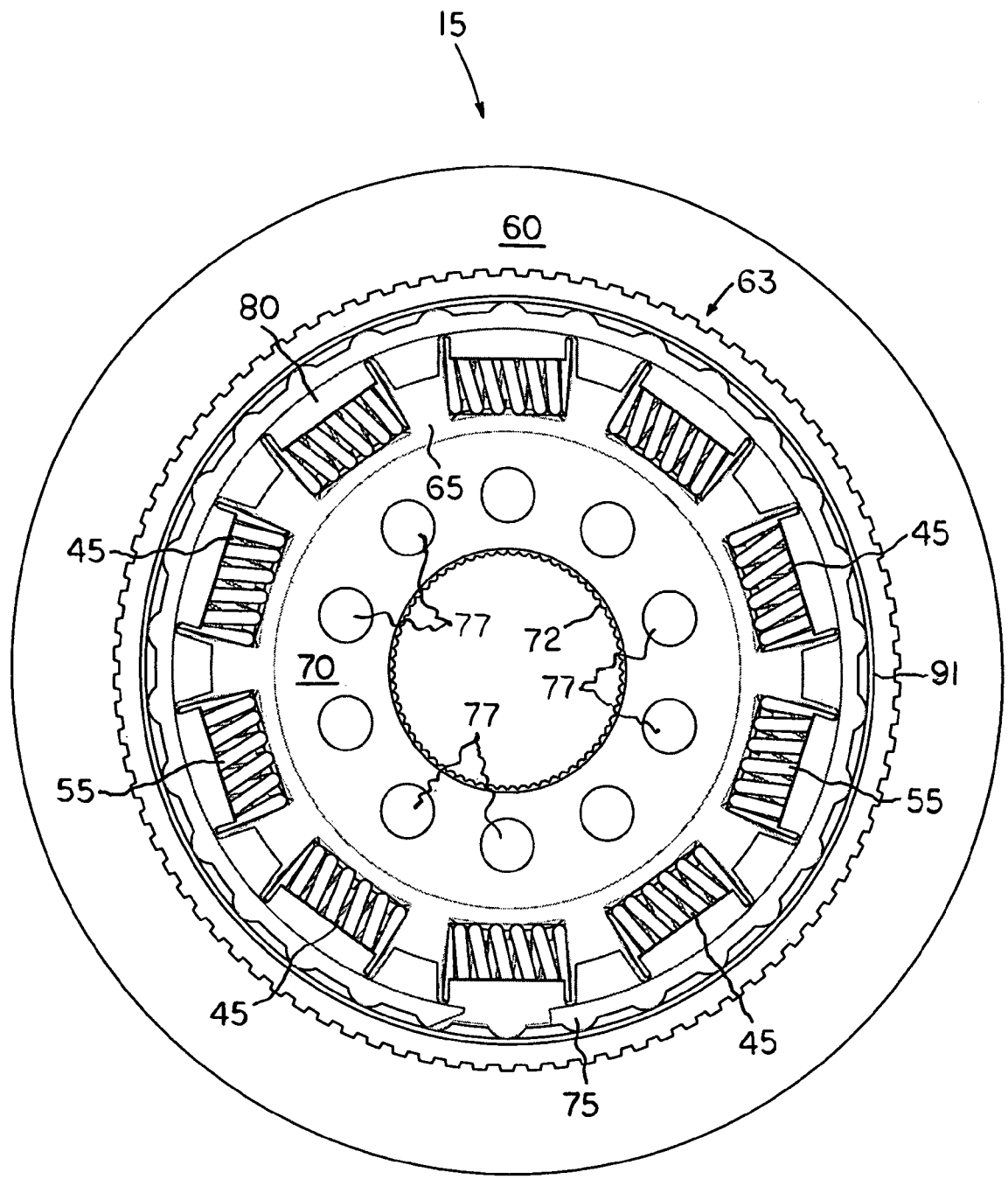
FIG. 8 is a top plan view of the present universal multiplate torque converter clutch showing the hybrid lock-up piston/damper plate subassembly of the present invention.

As more clearly shown in FIG. 8, the present hybrid lock-up piston/damper plate subassembly 15 further comprises: (a) a piston carrier 60; (b) a pair of drive plates 65 (i.e. only top drive plate 65 shown); (c) a clutch hub 70; (d) a set of inner damper springs 45; (e) a set of outer damper springs 55; (f) a spring retainer 80; and (g) a retaining ring 75, which will now be described in further detail.

Figure 9A:
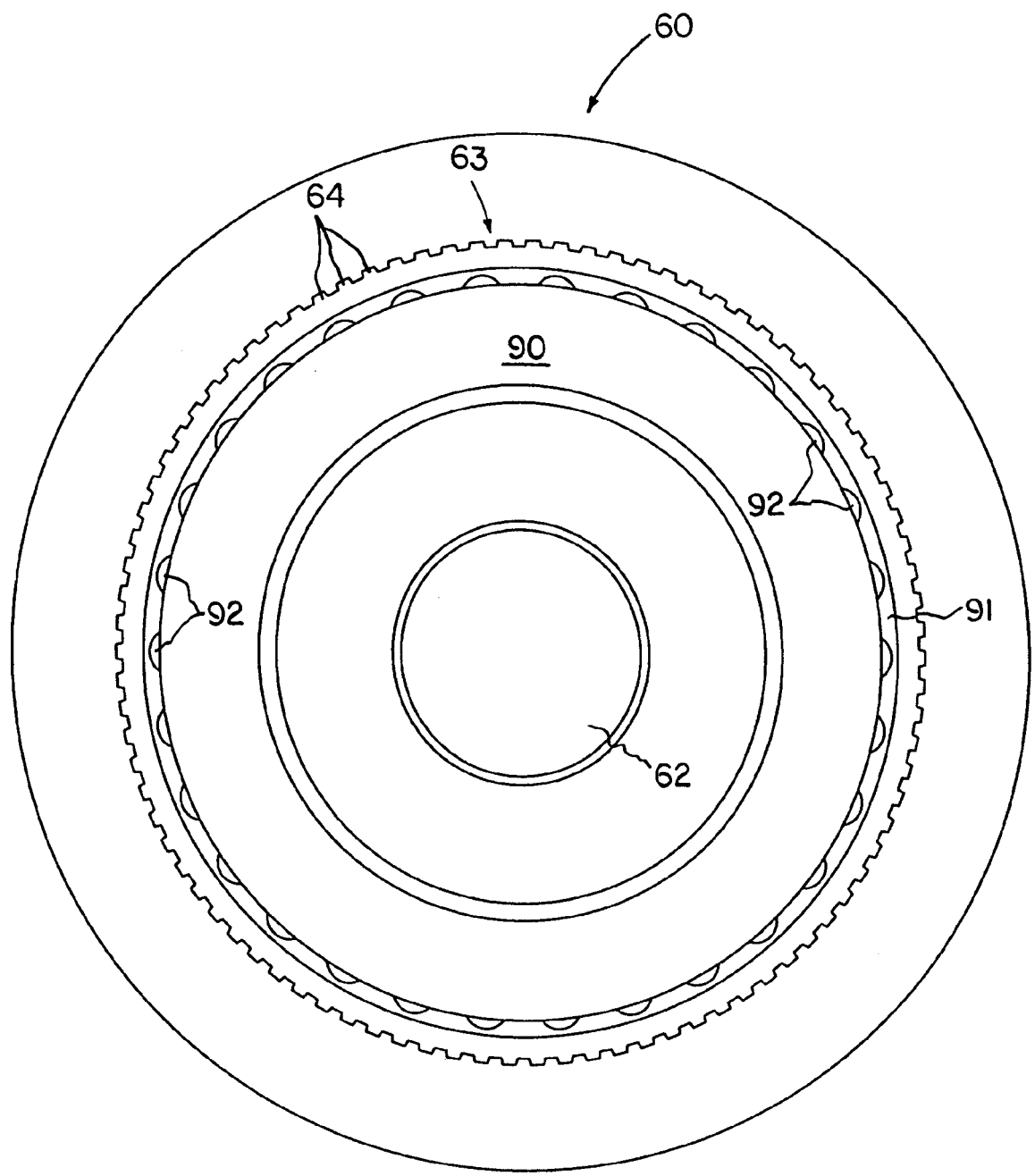
FIG. 9A is a top plan view of the piston carrier of the present invention.
Figure 9B:
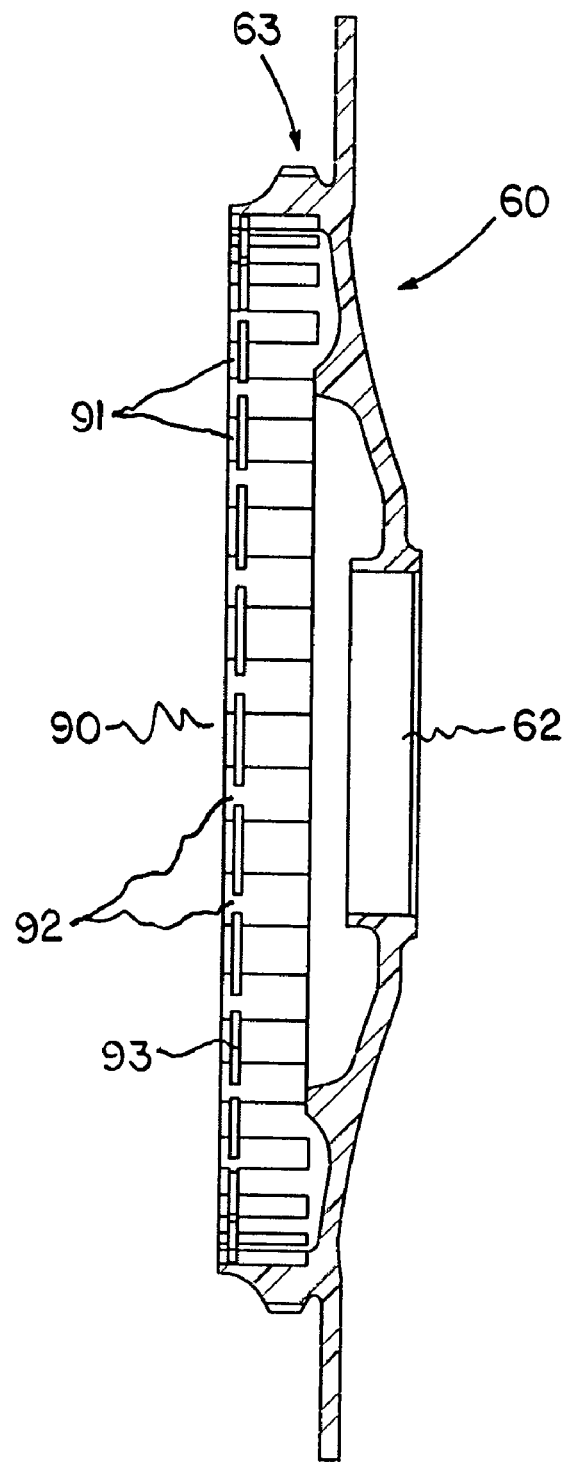
FIG. 9B is a longitudinal cross-section of the piston carrier shown in FIG. 9A.
Figure 15B:
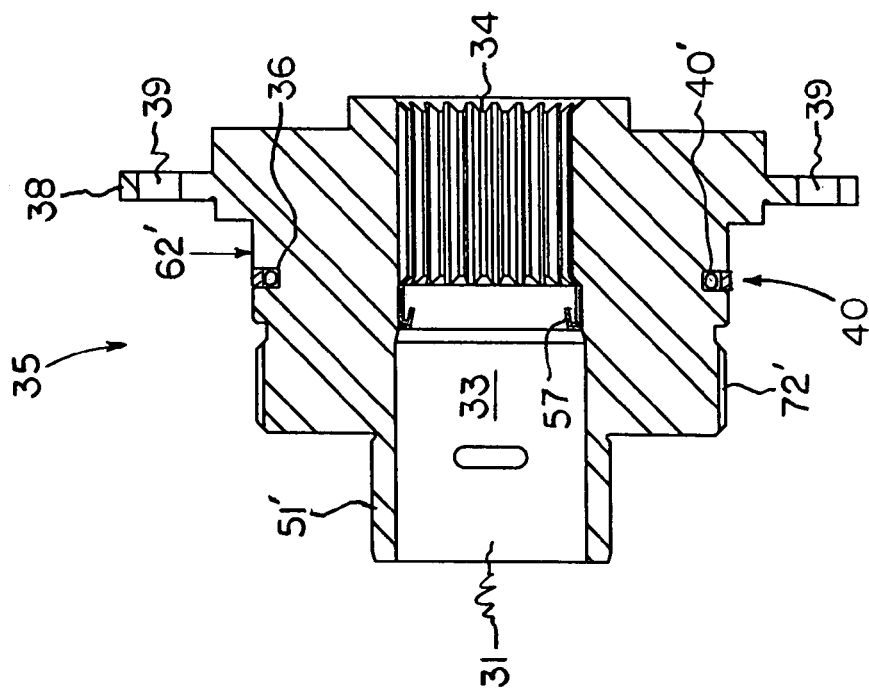
FIG. 15B is a longitudinal cross-section of the turbine hub of FIG. 15A taken along section line 15B-15B.
Figure 16:
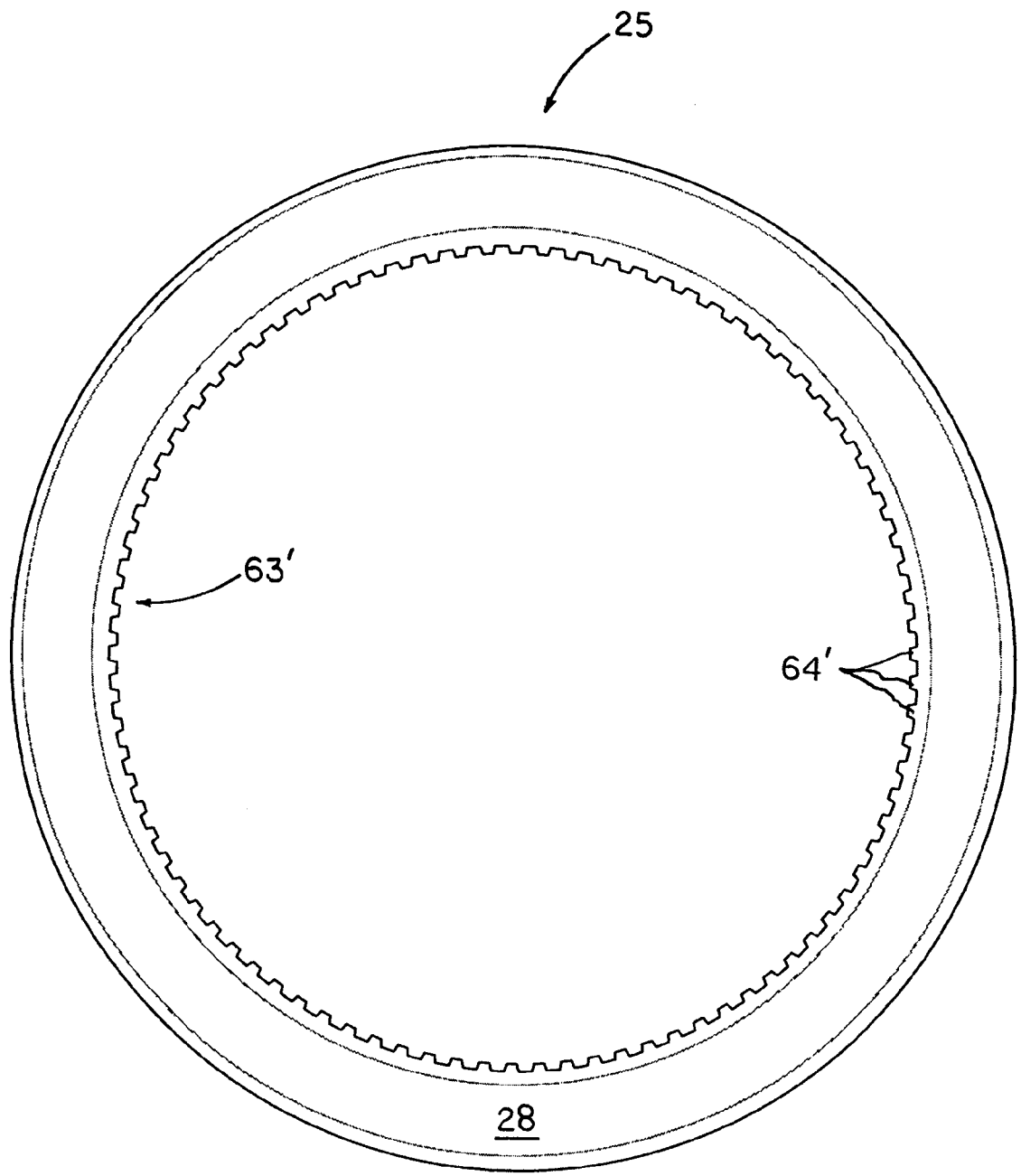
FIG. 16 is a top plan view of a primary clutch plate of the present invention.

With reference to FIGS. 9A and 9B there is shown therein a piston carrier 60, which is a generally dish-shaped component having a center opening 62. Piston carrier 60 is fabricated from a steel forging in accordance with American Iron and Steel Institute (hereinafter "AISI") 1045 or other suitable material. Piston carrier 60 includes an external spline, indicated generally at 63, having a plurality of teeth 64 formed thereon for mating engagement with an internal spline 63' including mating teeth 64' formed in clutch plate 25 (FIG. 16). Center opening 62 (FIG. 9A) of piston carrier 60 engages a mating diameter 62' of turbine hub 35 during assembly and thereby surrounds TEFLON seal 40 including an underlying O-ring 40' disposed in groove 36 (FIG. 15B).

Still referring to FIGS. 9A and 9B, piston carrier 60 includes an integral receptacle 90 wherein the components of the present hybrid piston/damper plate assembly 15 are installed. It can be seen that receptacle 90 includes a plurality of semicircular notches 92 machined therein. Semicircular notches 92 are formed in a symmetrical pattern about the circumference of receptacle 90 to receive mating semicircular protuberances 92' formed on a matched pair of drive plates 65 provided with the present hybrid piston/damper plate subassembly 15 as shown in FIGS. 10A and 10B. In this manner rotation of the drive plates 65 is precluded within the receptacle 90 after installation. Each drive plate 65 includes an array of damper spring pockets 66, which receive damper springs 45, 55 (FIG. 8) therein. It will be appreciated that during assembly of the hybrid lock-up piston/damper plate 15, each array of damper spring pockets 66 within the drive plates 65 is arranged in alignment to receive damper springs 45, 55.

Figure 11B:
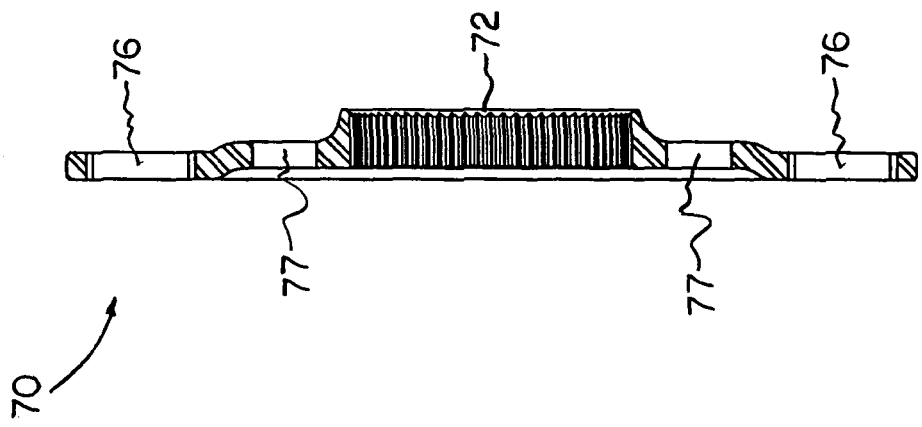
FIG. 11B is a longitudinal cross-section taken along section line 11B-11B of FIG. 11A.
Figure 11A:
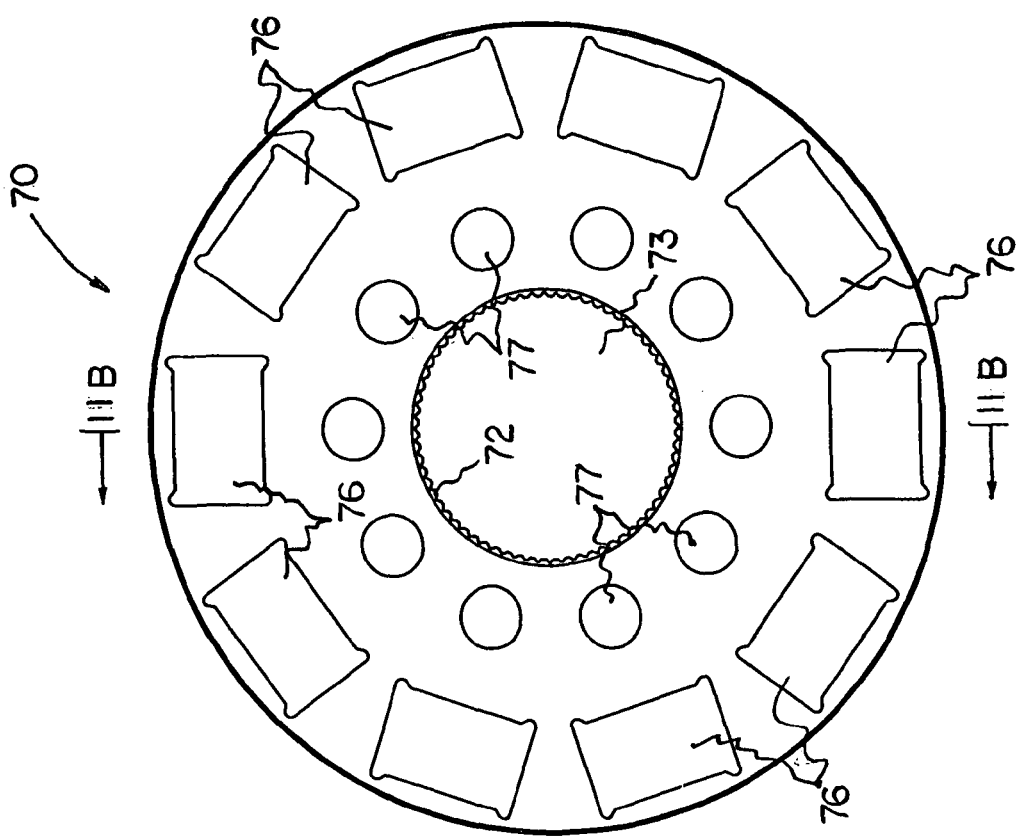
FIG. 11A is a top plan view of a clutch hub of the present invention.

Referring to FIGS. 11A and 11B a clutch hub 70 is also provided for installation within receptacle 90. In the present clutch system, clutch hub 70 is captured between the pair of drive plates 65 (see FIG. 7) during assembly. Clutch hub 70 also includes an array of damper spring pockets 76, which function to receive damper springs 45, 55 therein. It will be understood that during assembly clutch hub 70 is rotated to the same angular orientation as drive plates 65 within receptacle 90 such that damper spring pockets 66, 76 are positioned in axial alignment to receive damper springs 45, 55.

After clutch hub 70 is installed as shown in FIGS. 7 and 8, it will be appreciated that the clutch hub is imparted with up to 8.4° angular rotation relative to the fixed drive plates 65 against the force of damper springs 45, 55 to dampen clutch engagement during the lock-up cycle. To this end it can be seen that clutch hub 70 also includes an array of weight reducing holes 77 to reduce its mass.

A spring retainer 80 fabricated from stainless steel sheet in accordance with the American Society of Testing and Materials (hereinafter "ASTM") specification A-177 is provided in the configuration shown in FIGS. 12A and 12B. Spring retainer 80 includes a plurality of spring tabs 82 bent upwardly at approximately 45 degrees, which are also positioned in overlying relation to outer damper springs 55 during assembly as most clearly shown in FIG. 8.

Advantageously, a single retaining ring or so-called snap ring 75 also fabricated from stainless steel sheet in accordance with ASTM specification A-177 is utilized to secure the components of the present hybrid lock-up piston/damper plate assembly 15 (i.e. drive plates 65, clutch hub 70, damper springs 45, 55, spring retainer 80) within piston carrier 60 (FIG. 8). Snap ring 75 is installed behind lip 91 within the interrupted groove 93 formed in receptacle 90 as most clearly shown in 9B. A commercially available snap ring 75, namely, part #VH-825 manufactured by the Smalley Steel Ring Company, Lake Zurich, Ill. 60047, is suitable for this purpose.

An innovative feature of the present invention permits the hybrid lock-up piston/damper plate subassembly 15 to be tuned to match the specific peak torque of a given vehicle's engine wherein the present universal clutch system 10 is to be utilized. Initially, it will be understood that the hybrid lock-up piston/damper plate assembly 15 of the present invention is provided with the entire complement of ten pairs dampers springs 45, 55 installed (FIG. 8).

Figure 13:
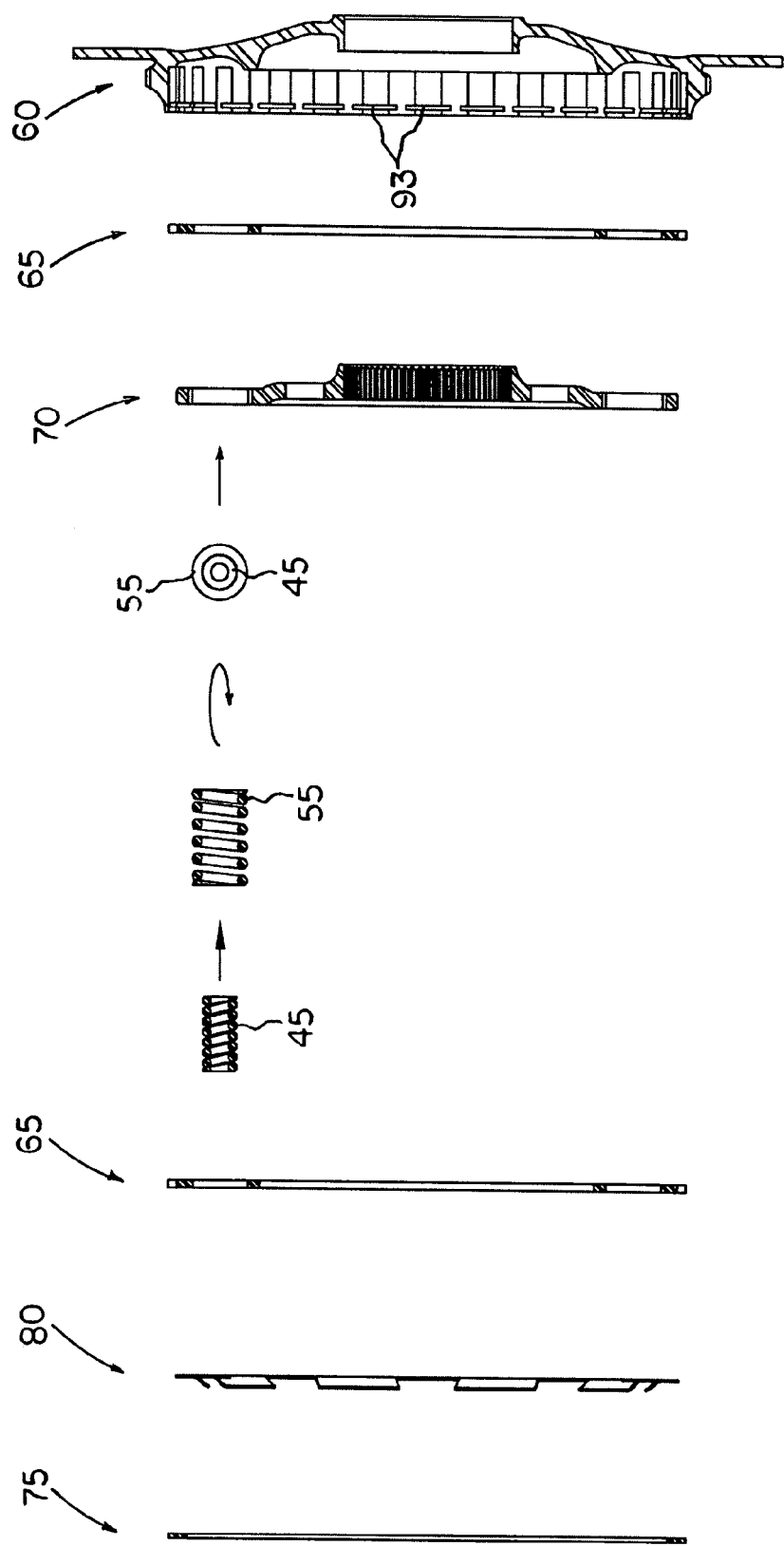
FIG. 13 is an exploded cross-sectional view of the components of the hybrid lock-up piston/damper plate subassembly of the present invention.

With reference to FIG. 13, tuning the hybrid lock-up piston/damper plate subassembly 15 requires changing the number of inner damper springs 45 to match peak engine torque. To accomplish this retaining ring 75 is initially removed from groove 93 with a suitable tool. Next, the spring retainer 80 and the upper drive plate 65 are removed and set aside. Next, damper springs 45, 55 are removed and/or reinstalled to match engine torque (i.e. expressed in foot-lbs.) in accordance with Table 1 (FIG. 14). Note that only an even number of damper springs 45, 55 is utilized and that inner damper springs 45 must be installed in a symmetrical pattern 180° apart within outer damper springs 55. This prevents binding of the present hybrid lock-up piston/damper plate subassembly 15 and imbalance of the subassembly during operation.

Next, the upper drive plate 65, spring retainer 80, and snap ring 75 are reassembled as described hereinabove. Finally, it is recommended that the present hybrid lock-up piston/damper plate subassembly 15 be balanced as a separate unit before being further assembled into the torque converter.

Since such rotational balancing procedures for automotive components are well known to those skilled in the art, further detailed discussion is not deemed necessary.

Figure 15A:
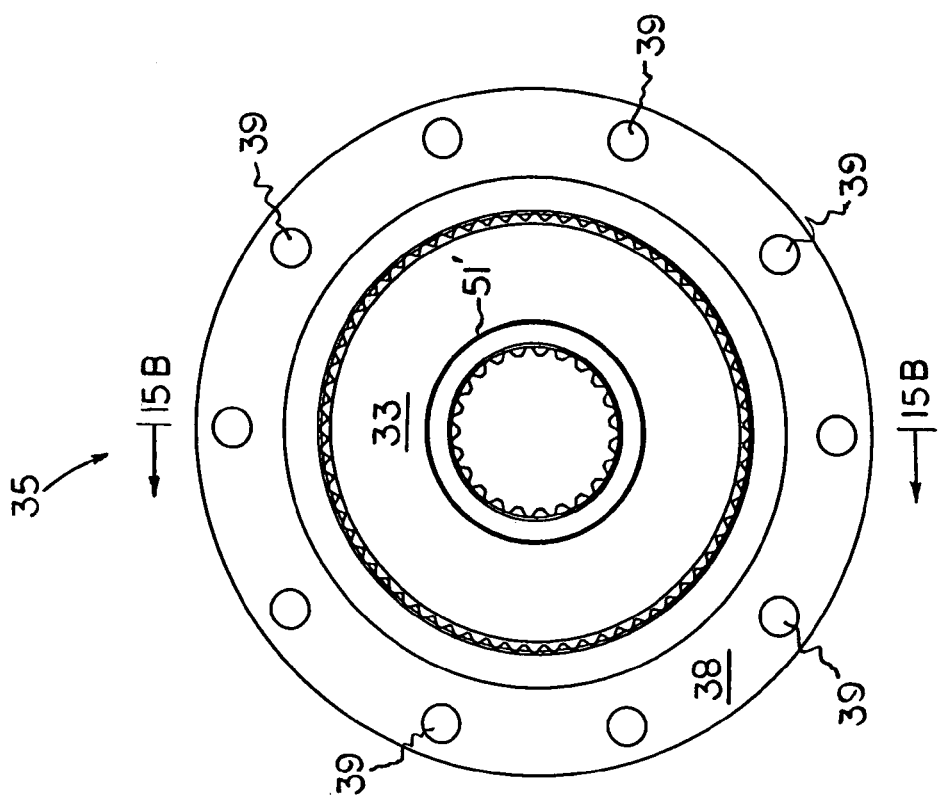
FIG. 15A is a top plan view of the turbine tub of the present invention.

With reference to FIGS. 15A and 15B, there is shown therein the present turbine hub subassembly, indicated generally at 35. The turbine hub 33 is a generally cylindrical component including an integral perpendicular flange 38, which includes a radial array of rivet holes 39 drilled therein. Turbine hub 33 also includes an external spline 72' for engagement with an internal spline 72 formed in the clutch hub 70 (FIGS. 11A and 11B). In addition, turbine hub 33 includes an internal bore 31 wherein an internal spline 34 is formed, which receives a mating turbine shaft 151' (FIG. 7) at assembly.

To install the present turbine hub 33 the OEM rivets 275 attaching the OEM turbine hub 201 (FIG. 4) are initially removed and the OEM turbine hub 201 is separated from the OEM turbine 110. Next, the OEM turbine 110 is cleaned and inspected. If any turbine blades 113 are loose, the blades are repaired by brazing/welding or a different OEM turbine 110 is obtained for reassembly. Next, the present turbine hub 33 is positioned within the turbine 110 in replacement of OEM turbine hub 201 and new rivets 275 are installed. Next, a TEFLON seal 40 with an underlying O-ring 40' are installed within groove 36 in the journal diameter 62' of the turbine hub 33. In the embodiment shown in FIG. 15B, a new radial lip seal 57 is installed within the bore 31 of turbine hub 33. It will be understood that some alternative embodiments of the present invention, namely, the FORD E4OD and GM 4L80E cover assemblies do not utilize a radial lip seal 57.

It will be understood by those skilled in the art that the turbine hub 33 for each kit provided in the present universal clutch system for the subject transmissions differs slightly in its size and configuration, namely, in the flange 38, in the internal bore 31, and in the internal spline 34, which are dimensioned to fit the mating parts of the subject transmissions.

Referring to FIG. 16 the present primary clutch plate 25 is fabricated from sheet steel in accordance with AISI 1050 or other suitable material and includes friction rings 28 bonded to both the forward and aft facing surfaces thereof, which engage a mating contact surface 52 within front cover 50 (FIG. 18B) and also a mating surface of the present secondary clutch plate 30 (FIG. 17) respectively during the lock-up cycle.

Figure 17:
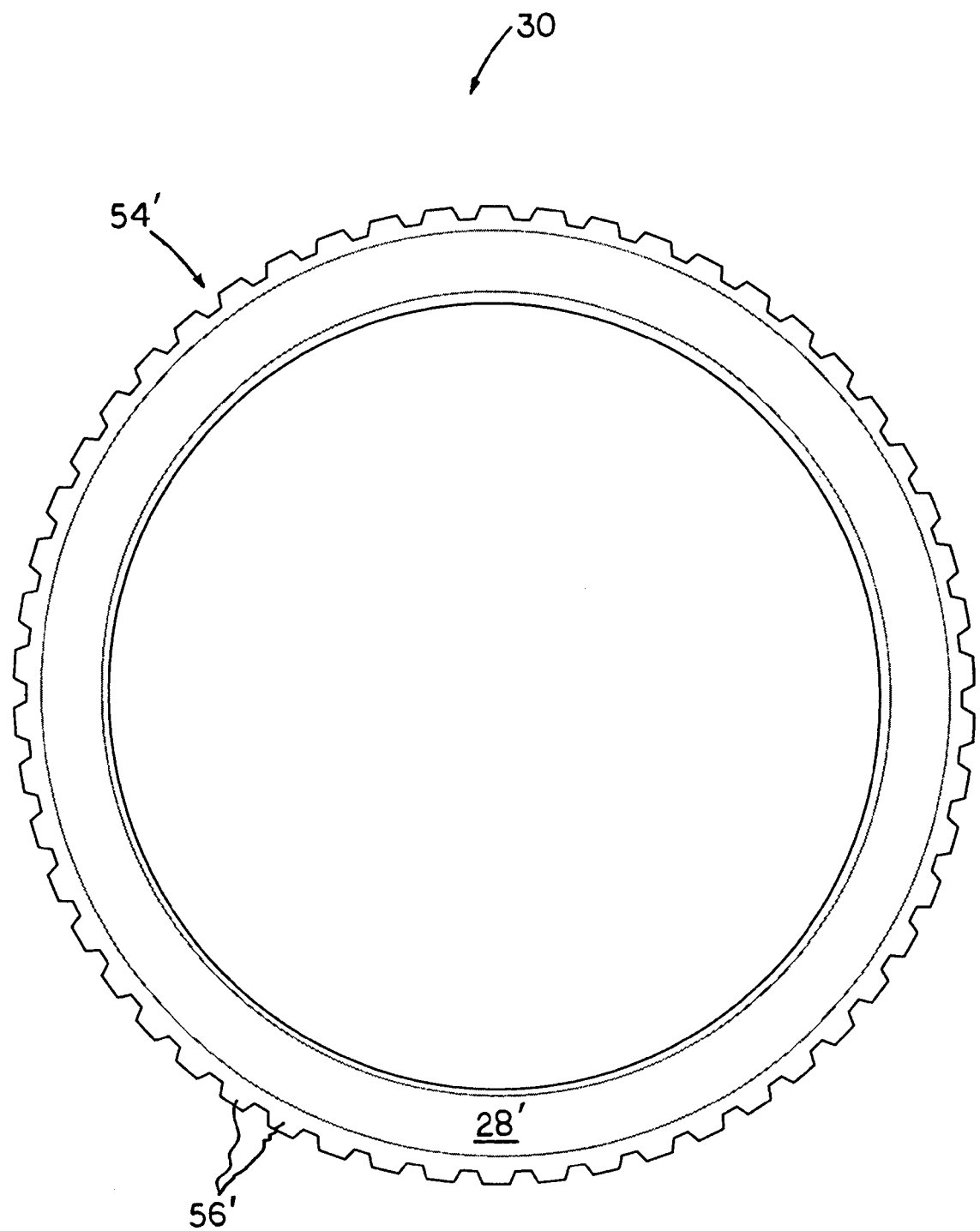
FIG. 17 is a top plan view of a secondary clutch plate of the present invention.

With reference to FIG. 17 the present secondary clutch plate 30 is also fabricated from sheet steel in accordance with AISI 1050 or other suitable material and includes a friction ring 28' on the aft facing surface thereof, which engages a mating forward facing surface of piston carrier 60 during the lock-up cycle. Secondary clutch plate 30 also includes an external spline, indicated generally at 54', including a plurality of teeth 56' formed thereon for mating engagement with an internal spline 54 including mating teeth 56 formed in front cover subassembly, indicated generally at 50 (FIG. 18B).

Figure 18B:
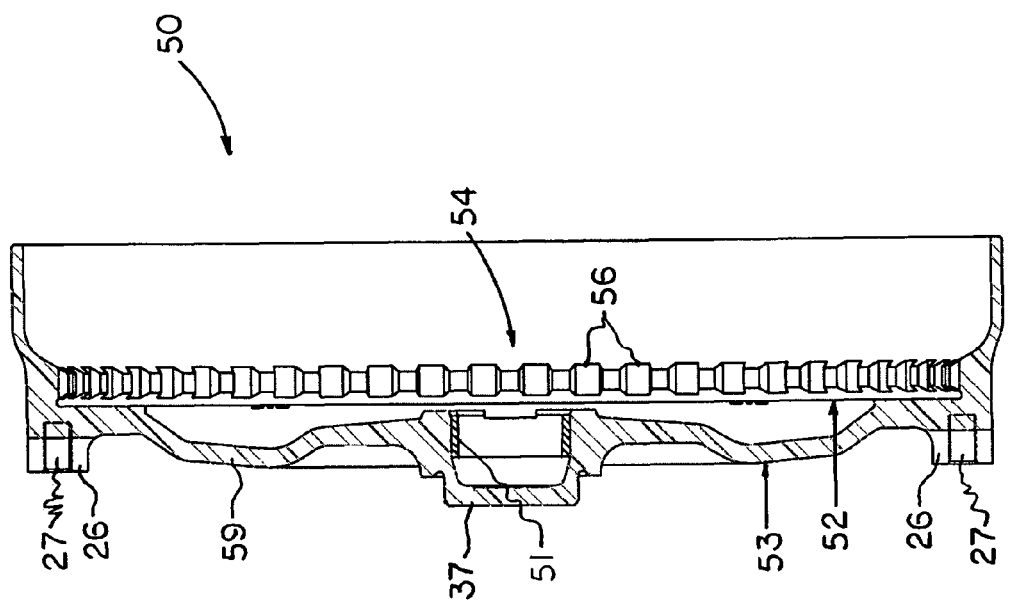
FIG. 18B is a longitudinal cross-section of the front cover of FIG. 18A taken along section line 18B-18B.

As shown in FIGS. 18A and 18B cover housing 59 is a bowl-shaped component machined from a steel forging in accordance with AISI specification 1026. Cover housing 59 functions to enclose the present universal torque converter clutch system and to attach the torque converter to the vehicle's engine via flexplate 85 (FIG. 7). More particularly, a forward facing surface 53 of cover housing 59 includes a plurality of integral bosses 26 having threaded holes 27 formed therein. Cover housing 59 also includes a cover pilot 37 projecting from surface 53 (FIG. 18B) which functions to locate the front cover in coaxial relation to the engine crankshaft (not shown). Threaded holes 27 receive machine bolts 29, which attach the engine flexplate 85 to the cover housing 50 (FIG. 7). In the present invention it will be appreciated that because the present universal clutch system 10 is designed to be installed in different vehicles utilizing the subject transmissions, the pattern of threaded holes 27 and, thus, the construction of cover housing 59 varies to facilitate installation in the subject transmissions.

Figure 19A:
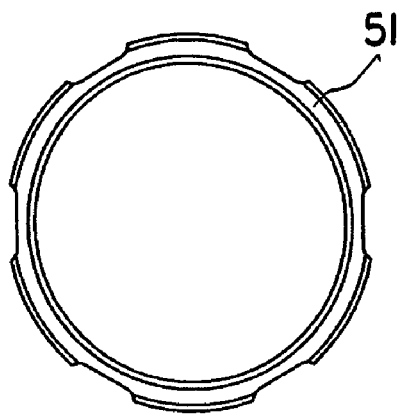
FIG. 19A is a top plan view of the front cover bushing of the present invention.
Figure 19B:
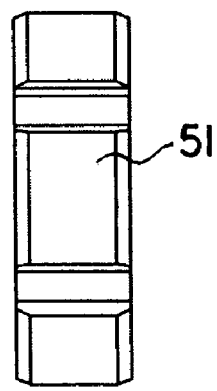
FIG. 19B is a side elevation view of the present front cover bushing rotated 90° from the position shown in FIG. 19A.

In the embodiment shown in FIG. 18B, cover housing 59 is provided with a cover bushing 51, which supports and engages a mating bearing journal 51' formed on turbine hub 33. Bushing 51 is fabricated from steel in accordance with the Society of Automotive Engineers (SAE) specification 799 or another suitable material in the configuration shown in FIGS. 19A and 19B. It will be understood that some alternative embodiments of the present invention, namely, the FORD E40D, ALLISON 1000, and GM 4L80E cover assemblies do not utilize a cover bushing 51.

Figure 20:
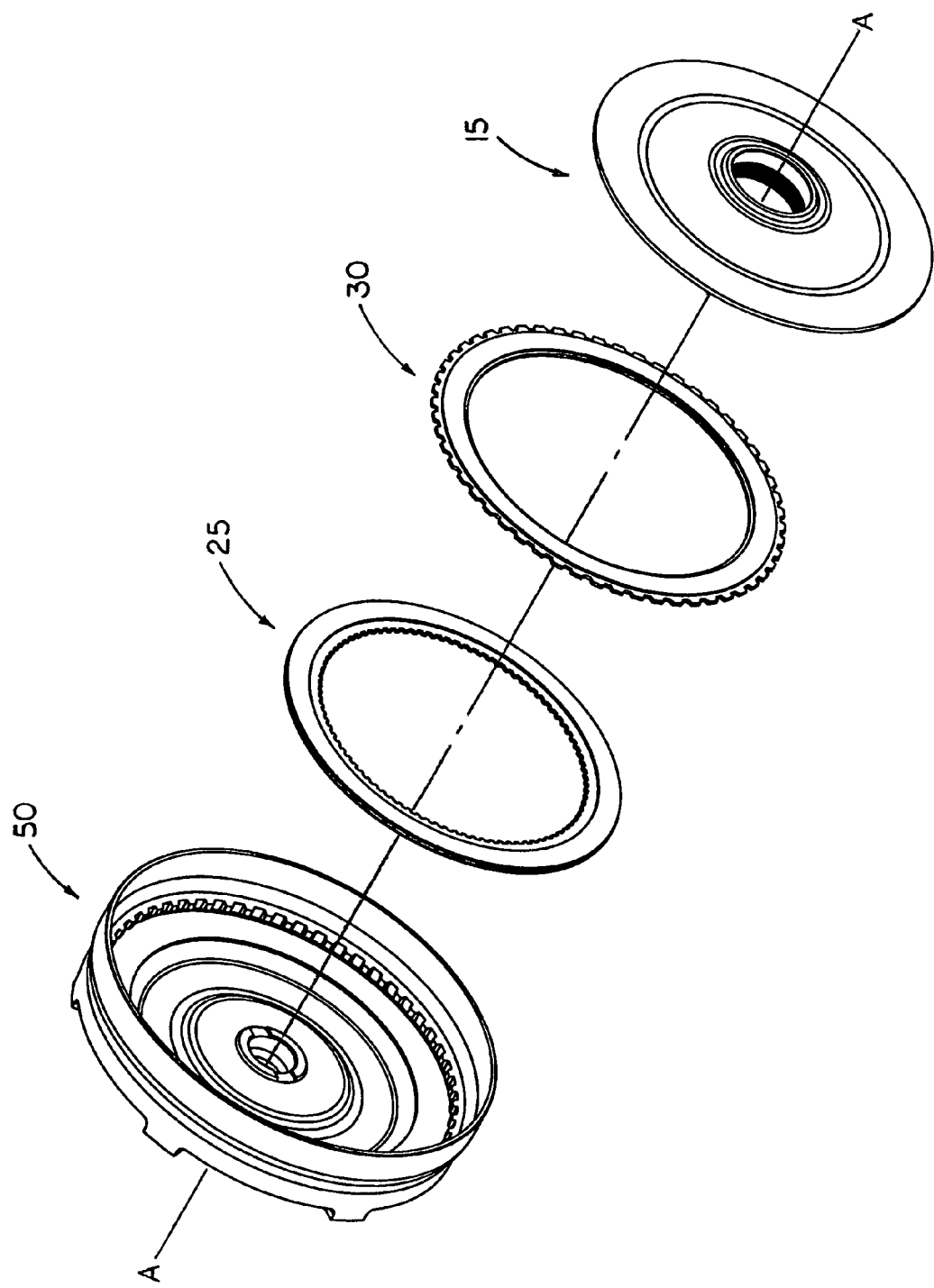
FIG. 20 is an exploded view illustrating the assembly of the cover, primary clutch plate, secondary clutch plate, and the hybrid lock-up piston/damper plate subassembly of the present invention.

In a method of the present invention, a cover housing 59 with a cover bushing 51 installed (FIG. 18B) is selected based on the particular vehicle engine and transmission to be utilized. Next, a turbine hub 33 with the correct internal spline 34 and flange 38 is selected based on the given turbine 110 and turbine shaft 151 to be utilized and, thereafter, is installed on turbine as described hereinabove. Next, the present hybrid lock-up piston/damper plate subassembly 15 including the damper springs 45, 55 specified in Table 1 is assembled based on the engine's peak torque output as described hereinabove and is separately balanced using known techniques. Thereafter, the hybrid lock-up piston/damper plate subassembly 15, primary clutch plate 25, and secondary clutch plate 30 are installed within cover subassembly 50 in coaxial relation to longitudinal axis -A- as shown in FIG. 20. Next, the energizer O-ring 40' and the TEFLON seal 40 are installed within groove 36 and the radial lip seal 57 (when applicable) is installed within the bore 31 to complete the turbine hub subassembly 35. Next, the internal spline 72 of the clutch hub 70 is guided axially into mating engagement with the external spline 72' of the turbine hub subassembly 35 to the position shown in FIG. 7. Thereafter, the cover subassembly 50 is welded about its periphery at the junction with the OEM impeller assembly 105 as at 95. Next, the assembled torque converter is guided axially into mating engagement with the turbine shaft 151' and stator support shaft 152 (FIG. 7) of the transmission. Thereafter, flexplate 85 is attached to the engine crankshaft (not shown). Next, the transmission and torque converter assembly are installed by guiding the cover pilot 37 into engagement with the crankshaft. Thereafter, cover subassembly 50 is attached to flexplate 85 by machine bolts 29 to complete the installation (FIG. 7).

Although not specifically illustrated in the drawings, it should be understood that additional equipment and structural components will be provided as necessary and that all of the components described above are arranged and supported in an appropriate fashion to form a complete and operative Universal Multiplate Torque Converter Clutch System and Method of Use incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of our invention, what we desire to secure by U.S. Letters Patent is:

The invention claimed is:

1. A universal multiplate torque converter clutch system adapted to replace an original equipment manufacturer torque converter clutch assembly residing within an original equipment manufacturer transmission, wherein the original equipment manufacturer transmission includes an impeller assembly, a turbine hub, a stator assembly, the original equipment manufacturer torque converter clutch assembly, and a front cover arranged in coaxial relation about a longitudinal axis, the original equipment manufacturer torque converter clutch assembly further including a lock-up piston, a turbine, a damper plate assembly having a plurality of damper springs, and at least one clutch plate, the universal multiplate torque converter clutch system comprising:
    a replacement front cover sized and configured to mate with the impeller assembly at an aft end thereof and to an engine crankshaft at a forward end thereof;
    a first clutch plate proximate said front cover;
    a hybrid lock-up piston/damper plate subassembly including at least one drive plate and an external spline member engaged with said first clutch plate;
    a second clutch plate interposed between said first clutch plate and said hybrid lock-up piston/damper plate subassembly, said second clutch plate coupled to said replacement front cover; and
    a replacement turbine hub coupled to the turbine, said hybrid lock-up piston/damper plate subassembly, and said replacement front cover.

2. A universal multiplate torque converter clutch system of claim 1 wherein said hybrid lock-up piston/damper plate subassembly further includes:
    a piston carrier,
    a pair of drive plates having an array of damper spring pockets, wherein one of said pair of drive plates is disposed proximate said piston carrier;
    a clutch hub rotatably disposed between said drive plates and including an array of said damper spring pockets;
    a set of outer damper springs disposed within said damper spring pockets, wherein each of said outer damper springs sized and configured to accept an inner damper spring; and
    a spring retainer disposed in overlaying alignment to said outer damper springs, said spring retainer coupled to said piston carrier.

3. A universal multiplate torque converter clutch system of claim 2 wherein said piston carrier includes an array of semicircular notches formed about a periphery thereof.

4. A universal multiplate torque converter clutch system of claim 3 wherein said drive plates each include an array of semicircular protuberances for mating engagement with said array of semicircular notches formed in said piston carrier to prevent rotation of said drive plates therein.

5. A universal multiplate torque converter clutch system of claim 2 wherein a predetermined number of said inner damper springs are installed within said outer damper springs for tuning said hybrid lock-up piston/damper plate subassembly to a specific engine torque value.

6. A universal multiplate torque converter clutch system of claim 5 wherein said predetermined number of inner damper springs are installed within said outer damper springs in a symmetrical configuration.

7. A universal multiplate torque converter clutch system of claim 5 wherein said clutch hub is rotatable up to 8.4 degrees about said longitudinal axis relative to said drive plates against the force of said inner and said outer damper springs to absorb the impact of lock-up clutch engagement.

8. A universal multiplate torque converter clutch system of claim 1 wherein said replacement front cover includes a front cover housing having a front cover bushing installed therein.

9. A universal multiplate torque converter clutch system of claim 8 wherein said front cover housing includes an integral front cover pilot, wherein said front cover pilot is sized and configured to engage the engine crankshaft.

10. A universal multiplate torque converter clutch system of claim 1 wherein said plurality of replacement turbine hub subassemblies each include a TEFLON seal and an a-ring seal underlying said TEFLON seal.

11. A method of replacing an original equipment torque converter clutch assembly residing within an original equipment manufacturer transmission with a universal multiplate torque converter clutch system, wherein the original equipment manufacturer transmission includes at least an impeller assembly, a turbine assembly including an original equipment turbine hub and an original equipment turbine, a stator assembly, the original equipment torque converter clutch assembly, and a front cover, wherein the front cover engages the impeller assembly at an aft end thereof and an engine crankshaft at a forward end thereof, said universal multiplate torque converter clutch system comprising a replacement front cover including a front cover housing with a front cover pilot, a hybrid lock-up piston/damper plate subassembly including a set of outer damper springs and a set of inner damper springs, a first clutch plate, a second clutch plate, and a replacement turbine hub, the method comprising the steps of:
    providing a replacement front cover sized and configured to connect to the impeller assembly;
    installing a first and second clutch plate, wherein the first clutch plate is interposed between the front cover and the second clutch plate and wherein the second clutch plate is coupled to the front cover;
    assembling the hybrid lock-up piston/damper plate subassembly within the replacement front cover; and
    coupling a replacement turbine hub to the original equipment turbine, the hybrid lock-up piston/damper plate subassembly, and the front cover; and
    attaching the replacement front cover to the impeller assembly.

12. The method of claim 11 wherein said providing includes:
    inserting a front cover bushing into the front cover housing for mating engagement the replacement turbine hub; and
    machining the front cover pilot for mating engagement with the engine crankshaft.

13. The method of claim 11 wherein said installing includes:
    removing an original equipment turbine hub from an original equipment turbine assembly;
    attaching the replacement turbine hub to the original equipment turbine; and
    placing an a-ring seal and a TEFLON seal at a predetermined location on the replacement turbine hub.

14. The method of claim 13 wherein said attaching includes riveting the replacement turbine hub to the original equipment turbine.

15. The method of claim 11 wherein said assembling includes:
    tuning said hybrid lock-up piston/damper plate subassembly.

16. The method of claim 15 wherein said tuning includes:
    changing the total number of the inner damper springs within the hybrid lock-up piston/damper plate subassembly to match a specific peak torque value of a vehicle engine; and
    arranging the inner damper springs in a symmetrical configuration within the hybrid lock-up piston/damper plate subassembly to prevent imbalance.

* * * * *